United States Patent [19]
Sykes et al.

[11] Patent Number: 5,784,418
[45] Date of Patent: Jul. 21, 1998

[54] DUAL BAND DIGITAL BROADCAST RECEIVER

[75] Inventors: John Prailsford Sykes; Simon Parnall, both of Tadworth; Philip Andrew Laven, Horley, all of United Kingdom

[73] Assignee: British Broadcasting Corporation, London, United Kingdom

[21] Appl. No.: 403,686

[22] PCT Filed: Sep. 15, 1993

[86] PCT No.: PCT/GB93/01954

§ 371 Date: Apr. 10, 1995

§ 102(e) Date: Apr. 10, 1995

[87] PCT Pub. No.: WO94/07314

PCT Pub. Date: Mar. 31, 1994

[30] Foreign Application Priority Data

Sep. 15, 1992 [GB] United Kingdom ............... 9219486

[51] Int. Cl.$^6$ ..................... H04B 7/10; H04L 1/02
[52] U.S. Cl. .................. 375/347; 375/299; 455/137; 455/273
[58] Field of Search ..................... 375/347, 349, 375/260, 267, 299; 455/303, 59, 132, 133, 134, 135, 136, 272, 275, 277.1, 277.2, 137, 188.1, 273, 552; 370/491

[56] References Cited

U.S. PATENT DOCUMENTS

| | | |
|---|---|---|
| 4,317,220 | 2/1982 | Martin ......................... 455/58 |
| 4,972,410 | 11/1990 | Cohen et al. ...................... 370/100.1 |
| 5,170,413 | 12/1992 | Hess et al. ...................... 455/59 |
| 5,345,601 | 9/1994 | Takagi et al. .................... 455/59 |

FOREIGN PATENT DOCUMENTS 0004702 10/1979 European Pat. Off. .

OTHER PUBLICATIONS

F. Muller–Romer "Digitale terrestrishce Sendernetze fur Horfunk und Fernsehen", *Fernseh und Kino Technik*, vol. 45, No. 11, 1991, pp. 575–583.

V.M. Kolesnikow et al. "Eine Neue Konzeption Fur Den Digitalen Terrestrischen Horrundfunk", vol. 34, No. 6, Nov. 1990, *RTM Rundfunktechnische Mitteilungen*, pp. 276–278.

A. Weisser "Implications of DAB on Sound Contribution and Distribution Circuits", *1st International Symposium on DAB –1992 Proceedings*, Jun. 1992, pp. 127–136.

*Primary Examiner*—Don N. Vo
*Attorney, Agent, or Firm*—George W. Neuner

[57] ABSTRACT

A digital broadcast transmission system comprises a plurality of spaced transmitters (6). Each transmitter (6) receives signals for transmission from a master transmitter (2), e.g. on a satellite, along with a reference frequency ($F_{REF}$). The reference frequency is used to generate the transmission frequency at each spaced transmitter. At a receiver (12), conversion means can be used, to enable signals from the master transmitter (2) and from the other transmitter(s) to be received. A preferred application is digital audio broadcasting (DAB). Specifically, the present invention is useful in connection with Coded Orthogonal Frequency Division Multiplex (COFDM) modulation.

14 Claims, 5 Drawing Sheets

DUAL BAND DIGITAL BROADCAST RECEIVER

FIELD OF THE INVENTION

This invention relates to digital audio broadcast systems and in particular to systems which operate by transmitting signals from a network of transmitters.

BACKGROUND

A digital audio broadcasting system is currently being developed by a consortium of European manufacturers called Eureka 147. This has proposed a coded orthogonal frequency division multiplexed (COFDM) digital audio broadcast (DAB) modulation scheme. COFDM is a wide band modulation scheme which is specifically designed to cope with problems of multipath reception. The basic idea of COFDM is to take the digital signal (data) to be transmitted and divide it between a large number of adjacent carriers and divide it between time intervals so that only a small amount of data from a sample is carried at any one time. Error correction routines are used to correct for any errors in received signals. The carriers are arranged such that adjacent ones are mathematically orthogonal. This enables their side bands to overlap so that signals can be received without adjacent carrier interference and consequently a smaller bandwidth is necessary to transmit a plurality of carriers.

The signal is transmitted in bursts of data. Each burst is formed by distributing bits of the signal over the carriers (usually by quadrature phase shift keying) and then taking the Fast Fourier Transform (FFT) of the carriers. The resultant spectron is modulated by a further carrier, thus forming a broad band signal (DAB ENSEMBLE) for transmission. At a receiver the reverse process takes place.

In conventional AM/FM broadcasting a network of transmitters is provided. This is known as a "diversity" transmission system. Adjacent transmitters broadcast the same radio station on frequencies which have a sufficiently large gap between them for here to be no distortion in intermediate or "mush areas" between the transmitters. This is because there is no synchronisation of the transmission signals and therefore reception in such areas would be severely distorted if both transmitters were using the same frequency but were out of phase.

In a COFDM DAB modulation scheme each signal occupies a larger portion of the spectrum than a conventional AM/FM signal occupies because of its division onto a plurality of carriers which are used to form a "DAB ensemble". Because of this, even if signals on adjacent transmitters are spaced by the same amount as they would be in an AM/FM distribution network, there will still be interference in the intermediate or mush areas.

SUMMARY OF THE INVENTION

It has been appreciated that this problem can be overcome by synchronising the transmitters and arranging for them each to transmit identical program modulation and each to use the same frequency. Using such an arrangement, the signals from each transmitter will add constructively at a receiver, thereby enhancing rather than degrading reception. For such operation to be successful it is essential that all the transmitters radiate substantially identical carrier frequencies and that these carriers carry identical modulation (the DAB ensemble).

Therefore, the present invention features means for receiving a first digital broadcast signal and reference information in a first frequency band, means for receiving a second digital broadcast signal in a second frequency band, and means for frequency-converting the first digital broadcast signal into the second frequency band, as directed by the received reference information.

BRIEF FIGURE DESCRIPTION

The invention will now be described in detail by way of example with reference to the accompanying drawings in which.

DETAILED DESCRIPTION

It is proposed in a system embodying the invention that transmitters in a distribution network for DAB can be synchronised by distributing a pilot "master" frequency. This would preferably be transmitted via a satellite to all of the terrestrial transmitters along with a DAB ensemble comprising one or more program signals. A COFDM ensemble is generated at low IF frequency such as 1.5 MHz. The lowest frequency sideband would therefore be approximately 700 Khz clear of DC. This 700 Khz band is known as a guard band. It is proposed that the master pilot frequency should be included in this guard band.

Figure 1:
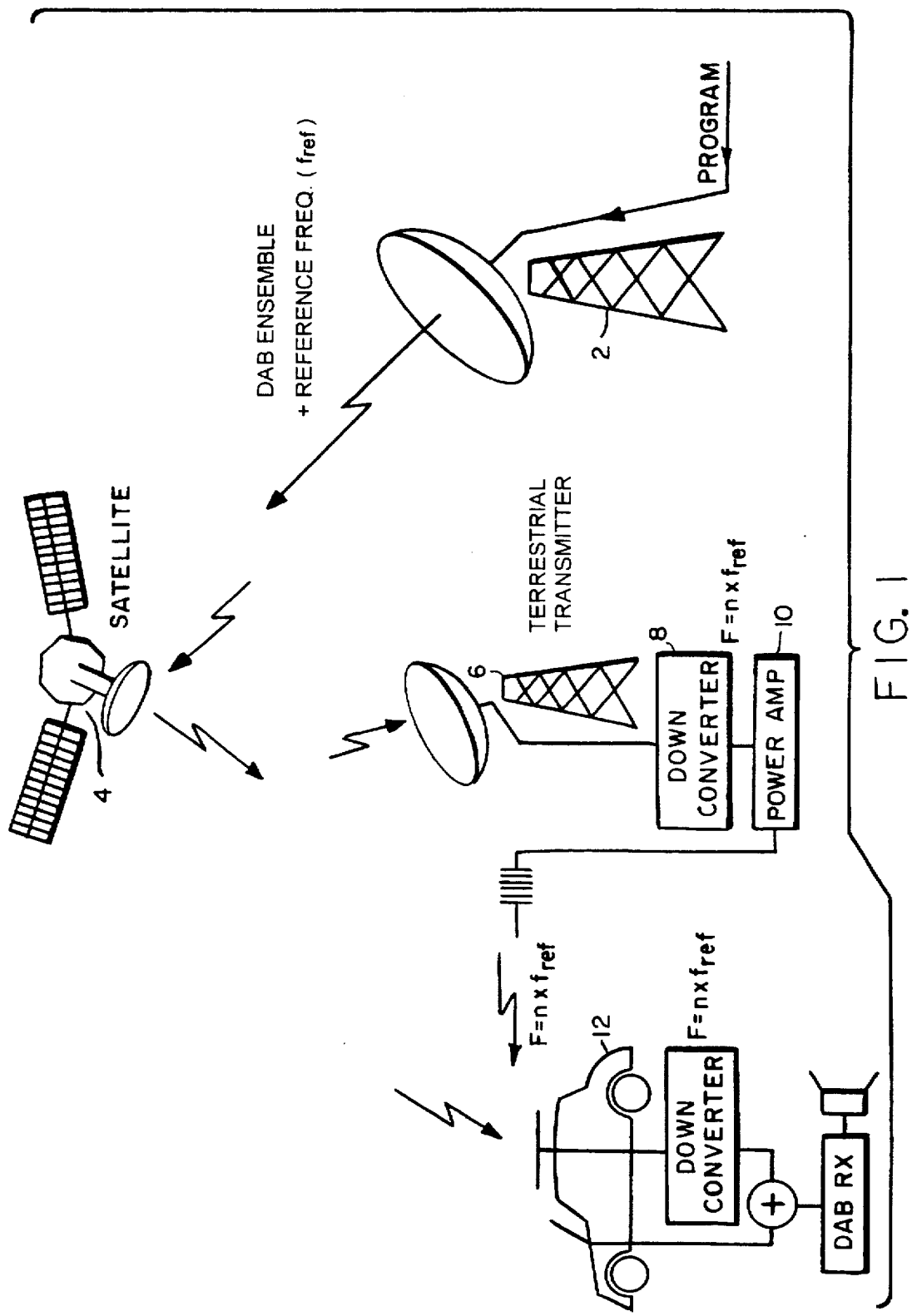
FIG. 1 shows a transmission and reception system embodying the present invention.

FIG. 1 shows a transmitter 2 receiving a program signal produced by a broadcaster. It then transmits this as a DAB ensemble along with a reference frequency $f_{ref}$ to a satellite 4. There are a plurality of terrestrial transmitters 6 which all receive a signal transmitted by the satellite 4. This signal again comprises the DAB ensemble and the reference frequency $f_{ref}$. The transmitter 6 locks onto $f_{ref}$ and uses this to select a frequency F at which to make a terrestrial transmission of the DAB ensemble. F is equal to $n \times f_{ref}$. A down converter 8 and power amplifier are provided at the terrestrial transmitter for making the necessary conversion and transmission. Thus all terrestrial transmitters are synchronised to the master reference frequency $f_{ref}$. There is no re-broadcast of the master frequency from the terrestrial transmitters.

Receivers such as the car receiver 12 in FIG. 1 receive the signal transmitted by the terrestrial transmitters 6, all of which are identical. Therefore when the car receiver is in a location between two transmitters and is receiving signals from both transmitters, these identical signals add constructively and enhance reception of the signal.

Figure 2:
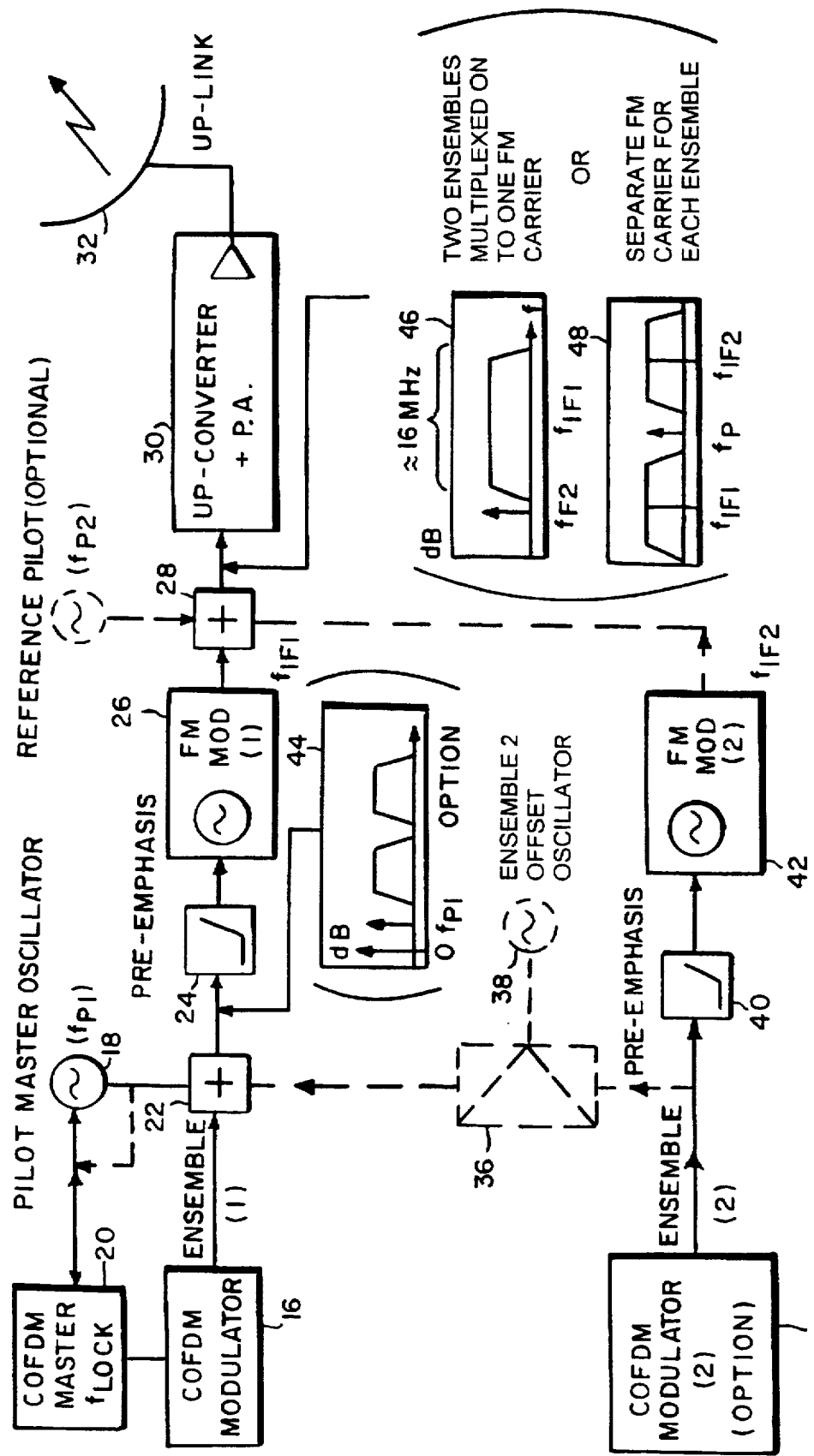
FIG. 2 shows a source transmitter for transmitting a signal to a satellite in an embodiment of the invention.

A possible implementation of the source transmitter 2 of FIG. 1 is shown in FIG. 2. This comprises a COFDM modulator 16 which is phase locked by a pilot master oscillator ($f_{p1}$) 18 via a COFDM master 20 producing a frequency clock. One or more radio signals is modulated into a DAB ensemble by the COFDM modulator 16. The ensemble and the signal from the pilot master oscillator are then added together in adder 22, the pilot signal being included in the guard band. The combined signals are then passed through a pre-emphasis filter 24 before being FM modulated in modulator 26. A further adder 28 can be used to add a further COFDM ensemble prior to transmission.

The signal then passes through an up converter 30 before being passed to a transmitter dish 32. The optional second signal is produced in COFDM modulator 34 and can either pass via a frequency shifter 36, controlled by an offset oscillator 38, to adder 22 where it is combined with the first ensemble, or it can pass via a pre-emphasis filter 40 and a second FM modulator 42 before being combined with the output of the first modulator 26 in adder 28.

The distribution of the reference frequency and the two ensembles after passing through adder 22 is shown at 44. The possible frequency distributions after passing through adder 28 comprise two ensembles multiplexed onto one FM carrier as shown at 46 for the situation where the ensembles are combined in adder 22, or a separate FM carrier for each ensemble as shown at 48 for the situation where the ensembles are combined in adder 28.

Figure 3:
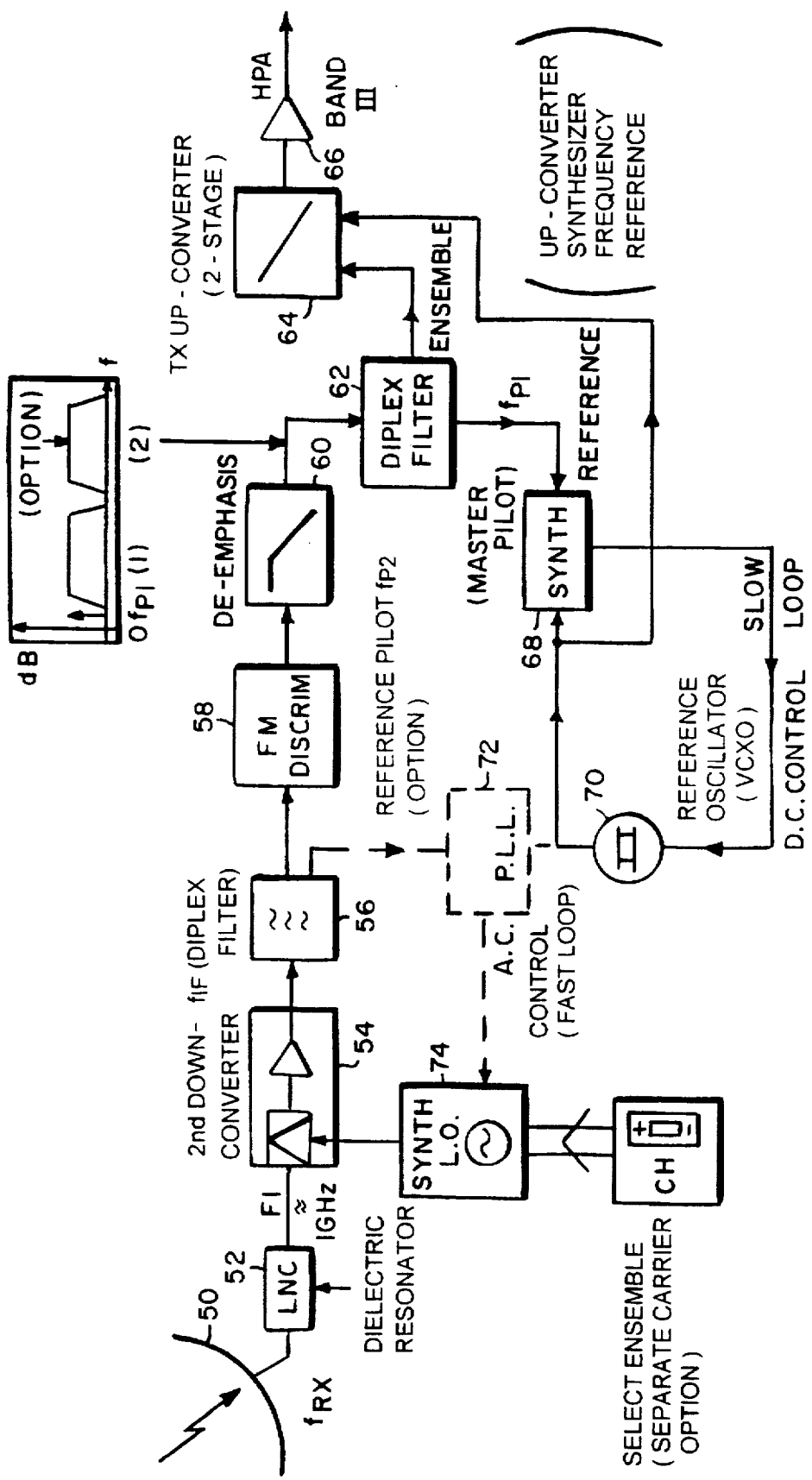
FIG. 3 illustrates circuitry for use fin a terrestrial transmitter embodying the invention.

The arrangement of the terrestrial transmitters 6 of FIG. 1 is shown in FIG. 3 and this shows a dish 50 receiving a signal from the satellite 4. The signal received passes through a dielectric resonator 52 and a down converter 54 before passing through a diplex filter 56, an FM discrimator circuit 58 and a de-emphasis filter 60. After this a signal such as the one shown at 44 in FIG. 2 is produced. This is passed to a diplex filter 62 which separates the DAB ensemble and the reference frequency $f_{p1}$. The DAB ensemble goes to an up converter 64 and then to an amplifier 66 ready for terrestrial band III transmission.

The reference signal $f_{p1}$ passes to a master pilot synthesiser 68 which controls a reference oscillator 70 to produce a reference frequency signal to control the transmission frequency of an up converter 64. This happens at every terrestrial transmitter and thus each transmitter transmits a band III terrestrial signal having substantially the same phase and frequency.

An alternative arrangement is shown for the situation where a separate FM carrier is used for one of the DAB ensembles. In this she reference pilot fp2 is extracted in the diplex filter 56 and passes to a phase locked loop 72 which provides a control signal for synthesiser 74. This includes an oscillator providing a reference frequency to the down converter 54.

It is also proposed that, particularly for terrestrial transmission in the urban enviroment, both satellite and terrestrial transmitters should feed programs to receivers i.e. receivers should be dual-band. A receiver, such as a car radio receiver, would have two inputs. One of these would receive satellite band transmissions and the other the band III terrestrial signal. The receiver could include circuitry to select the best signal, in rather the same manner as an RDS (radio data system) receiver does today.

Figure 5:
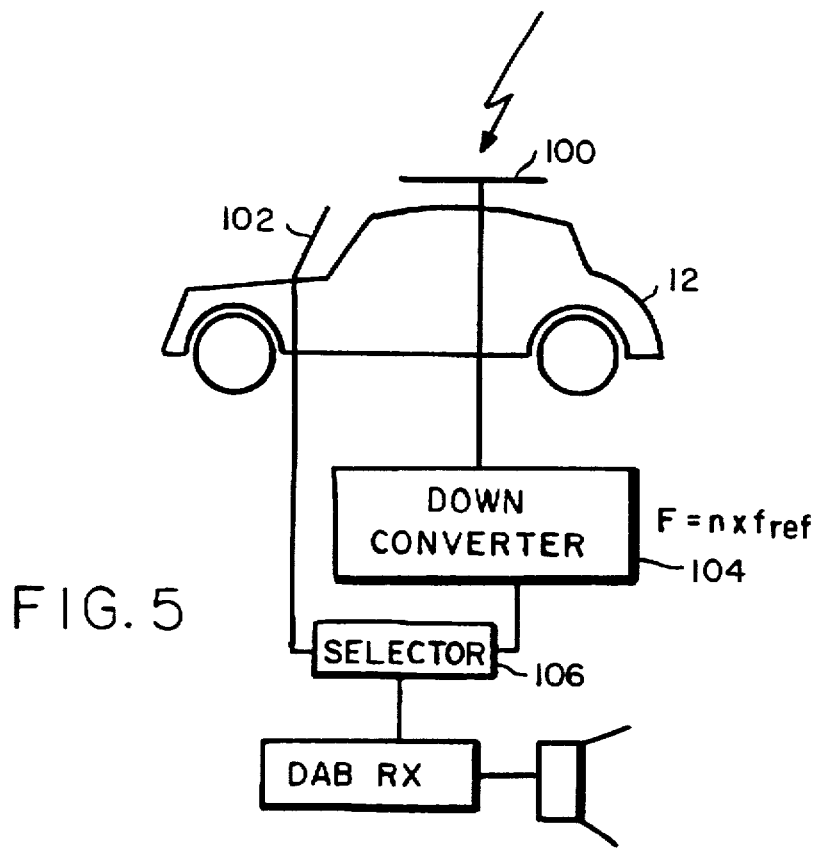
FIG. 5 schematically illustrates first and second receivers, a down converter, and a selector.

FIG. 5 shows, schematically, in outline form, a dual band digital broadcast receiver according to this aspect of the invention. This comprises a receiver 100 for receiving a digital broadcast signal and reference information in a first frequency band, a second receiver 102 for receiving a second digital broadcast signal in a second frequency band, and a converter 104 for converting the first digital broadcast to the second frequency band in dependence on the received reference information. The receiver further includes a selector 106 for selecting the best signal from the converted signal in the first frequency band and the second signal.

Figure 6:
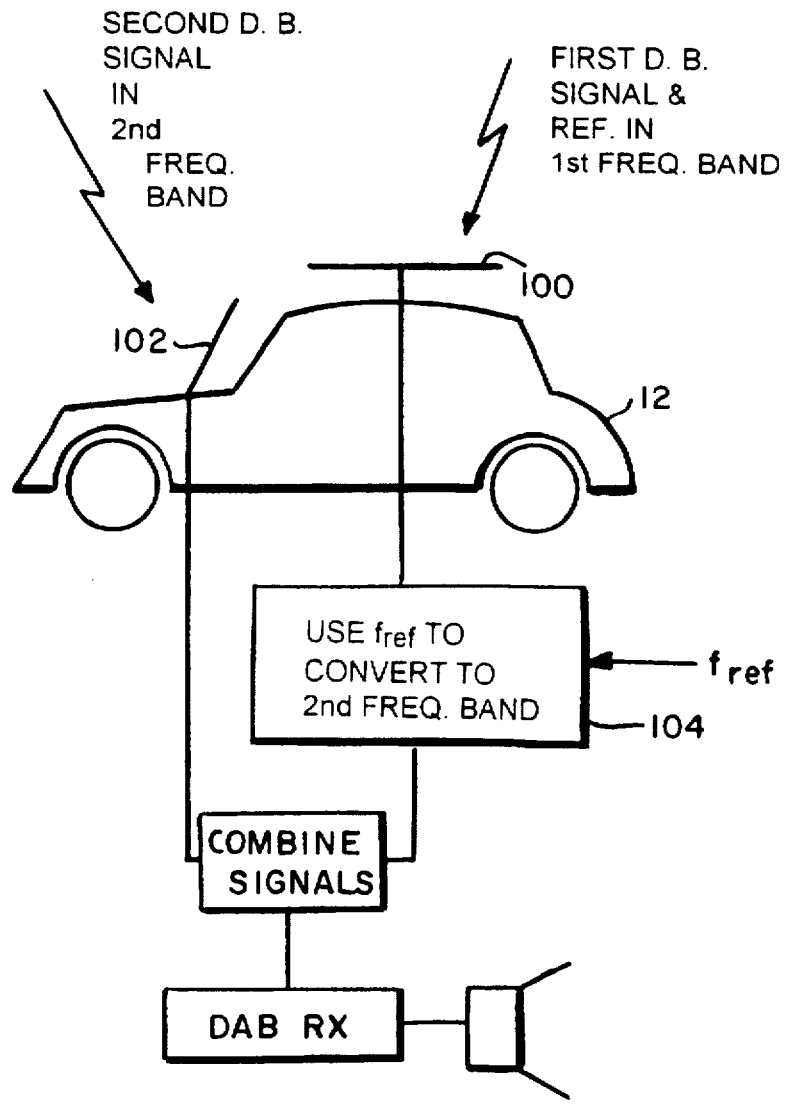
FIG. 6 illustrates schematically a dual-band receiver suitable for use in a car.

As shown in FIG. 6, a down converter 104 could be used in a receiver satellite aerial to generate a band III signal at the same frequency as that of the terrestrial network. Thus the signal from the down-converted satellite signal can be added to that of the terrestrial signal to form a single frequency signal of the type for which DAB was designed.

The composite signal (satellite and terrestrial) may be applied to the signal aerial input of a DAB receiver thereby removing the need or any additional COFDM decoders or diversity circuitry. Receivers will thus be able to exploit the resultant signal, as they move around, without any degradation in performance.

The down converter and adder to combine the satellite and terrestrial signals can be provided as a bolt-on unit to modify or retrofit a single-band terrestrial DAB receiver to a dual-band DAB receiver.

In such a system the terrestrial band III relay transmitter (6 in FIG. 1) performs exactly the same function as the down converter provided in the receiver's antenna, except that the output power is much greater and is radiated from a fixed site for reception by remote receivers.

In order to enable down converters (fixed or mobile) to generate band III signals at the correct frequency, a pilot or reference signal is added to the DAB ensemble carried by the satellite. This signal locks oscillators of all down converters to the same frequency, thereby providing the required single frequency operation. Should the broadcaster wish to change the band III frequency used it will simply be necessary to alter the pilot or reference frequency signal transmitted.

The reference signal can be transmitted in many different ways. Here it has been described as a frequency signal transmitted in the guard band i.e. outside the DAB ensemble. There is a zero frequency carrier in the center of the ensemble which could also be used to carry the reference signal or it could be transmitted in the synchronising interval between the DAB bursts.

The reference signal could also be transmitted as digital data which could then use some universal reference frequency available at the receiver to produce the desired frequency conversion for the DAB ensemble. This could be some inherent property of the DAB signal such as the synchronising frequency of the bursts of data.

Figure 4:
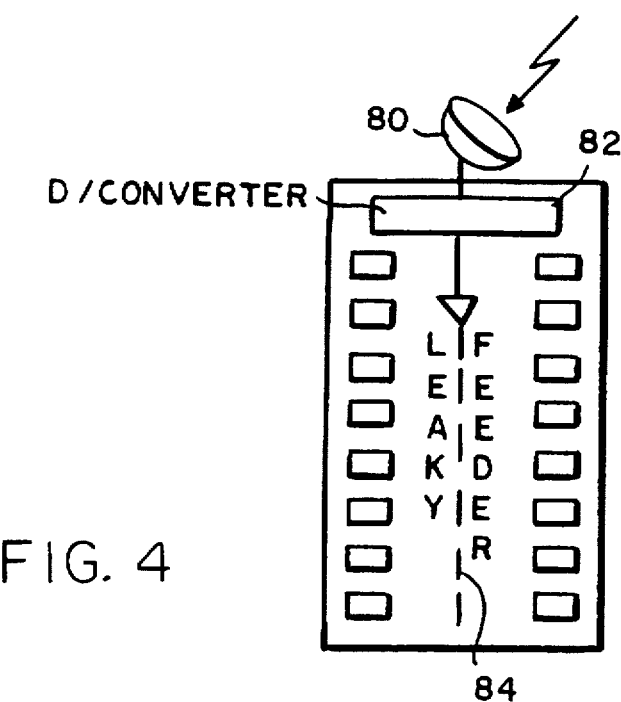
FIG. 4 shows an embodiment of the invention for use in a block of flats apartments to improve reception.

FIG. 4 shows how a down converter could be used for receiving a satellite signal in locations where terrestrial reception is poor such as a block of flats (apartments). An antenna 80 receives the satellite signal and a down converter 82 changes this to a band III signal. The band III signal is then distributed throughout the block of flats with a feeder 84.

We claim:

1. A dual band digital broadcast receiver comprising means for receiving a first digital broadcast signal and reference information in a first frequency band, means for receiving a second digital broadcast signal in a second frequency band, said second frequency band being selected independently of said first frequency band, means for converting the first digital broadcast signal to the second frequency band, in dependence upon the received reference information, and a combiner for combining the converted first digital broadcast signal with the second digital broadcast signal, the combiner operating in said second frequency band.

2. A dual band digital audio broadcast receiver according to claim 1,
   wherein said combiner is an adder which combines the second digital broadcast signal with the converted first digital broadcast signal.

3. A dual band digital broadcast receiver according to claim 1, wherein
   both of said digital broadcast signals are generated from the same source.

4. A dual band digital broadcast receiver according to claim 1, further comprising a filter for separating said first digital broadcast signal from said reference information.

5. A dual band digital broadcast receiver according to claim 4, wherein said reference information comprises a pilot tone carrier.

6. A dual band digital broadcast receiver according to claim 5, wherein a frequency of said pilot tone carrier specifies a factor by which said receiver reduces the frequency of said first digital broadcast signal to convert it into said second frequency band.

7. A dual band digital broadcast receiver according to claim 1, wherein said first and second digital broadcast signals are formed as orthogonal frequency division multiplexed (OFDM) signals.

8. A dual band digital broadcast receiver according to claim 7, wherein said first and second digital broadcast signals are formed as coded orthogonal frequency division multiplexed (COFDM) signals.

9. Apparatus for converting a single band digital broadcast receiver to a dual band digital broadcast receiver, comprising means for receiving a first digital broadcast signal and reference information in a first frequency band, means for receiving a second digital broadcast signal in a second frequency band, said second frequency band being selected independently of said first frequency band, means for converting the first digital broadcast signal to the second frequency band, in dependence upon the received reference information, and a combiner for combining the converted first digital broadcast signal with the second digital broadcast signal, the combiner operating in said second frequency band.

10. Apparatus according to claim 9, wherein said combiner is an adder which combines the second digital broadcast signal with the converted first digital broadcast signal.

11. An apparatus receiver according to claim 9, further comprising a filter for separating said first digital broadcast signal from said reference information.

12. An apparatus according to claim 9, wherein
    both of said digital broadcast signals are generated from the same source.

13. An apparatus according to claim 12, wherein said reference information comprises a pilot tone carrier.

14. An apparatus according to claim 13, wherein a frequency of said pilot tone carrier specifies a factor by which said receiver reduces the frequency of said first digital broadcast signal to convert it into said second frequency band.

* * * * *